United States Patent
Kobayashi

(10) Patent No.: US 7,369,264 B2
(45) Date of Patent: May 6, 2008

(54) HOST BASED PRINTER, HOST DEVICE AND PRINTING CONTROL METHOD

(75) Inventor: Tadashi Kobayashi, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 302 days.

(21) Appl. No.: 11/083,046

(22) Filed: Mar. 17, 2005

(65) Prior Publication Data

US 2005/0213150 A1     Sep. 29, 2005

(30) Foreign Application Priority Data

Mar. 23, 2004  (JP)  ............................ 2004-083871
May 20, 2004   (JP)  ............................ 2004-150207

(51) Int. Cl.
  *G06K 15/00*  (2006.01)
(52) U.S. Cl. .................... 358/1.16; 358/1.14; 358/1.15
(58) Field of Classification Search ..................... None
  See application file for complete search history.

(56) References Cited

U.S. PATENT DOCUMENTS

| | | | | |
|---|---|---|---|---|
| 5,274,461 | A * | 12/1993 | Mitsuhashi | 358/296 |
| 6,275,664 | B1 * | 8/2001 | Wolf et al. | 399/8 |
| 6,466,327 | B2 * | 10/2002 | Inaba et al. | 358/1.13 |
| 6,552,819 | B2 * | 4/2003 | Osawa et al. | 358/1.17 |
| 6,665,088 | B1 * | 12/2003 | Chiba et al. | 358/1.17 |
| 2002/0089684 | A1 * | 7/2002 | Barry et al. | 358/1.14 |
| 2003/0048492 | A1 * | 3/2003 | Maeda et al. | 358/486 |

FOREIGN PATENT DOCUMENTS

JP           63137880 A    *  6/1988

(Continued)

OTHER PUBLICATIONS

Japanese Patent Abstract □□Inventor: Yokoi Takaaki Title: Print Interval Control Circuit Publication Date: Jun. 9, 1988□□.*

(Continued)

*Primary Examiner*—King Y. Poon
*Assistant Examiner*—Richard Z Zhu
(74) *Attorney, Agent, or Firm*—Hogan & Hartson LLP

(57) ABSTRACT

A framework is provided which makes it possible to appropriately determine the printing starting timing, and to start printing, without waiting for the compression processing in the host device to be completed. A host based printer receives compressed data of a print image from the host device, restores the print image by expanding this compressed data, and executes printing on the basis of the print image. This host based printer comprises means for storing the timing S at which it is determined whether or not a printing operation can be started, means for predicting the data quantity q of the residual compressed data of the print image on the basis of the data quantity p of the compressed data that has been received by the timing S for the print image when this timing S arrives, means for predicting the time T1 that is required to receive the data of this data quantity q, means for predicting the time T2 that is required to print the print image, and means for causing a printing operation that restores the print image and executes printing to take place in cases where T1 is equal to or less than T2.

11 Claims, 7 Drawing Sheets

FOREIGN PATENT DOCUMENTS

| | | | | |
|---|---|---|---|---|
| JP | 09204278 | A | * | 8/1997 |
| JP | 09-300708 | | | 11/1997 |
| JP | 09300708 | A | * | 11/1997 |
| JP | 2003015836 | A | * | 1/2003 |
| JP | 2003029940 | A | * | 1/2003 |
| JP | 2004185048 | A | * | 7/2004 |

OTHER PUBLICATIONS

Japanese Patent Abstract Inventor: Nakazato et al Title: Printer Publication Date: Nov. 25, 1997.*

Japanese Patent Abstract Inventor: Okuzono Ryotarl Title: Printing System and Printing Control Method Publication Date: Jan. 17, 2003.*

Japanese Patent Abstract Inventor: Ide Hiroyasu Title: Dynamic Distribution Processing for Rendering Processing and Printing Controller Publication Date: Jan. 31, 2003.*

Japanese Patent Abstract Inventor: Ito Yoshiaki Title: Printing Time Prediction Device, Printing Time Prediction Method, Program and Storage Medium Publication Date: Nov. 25, 1997.*

Japanese Machine Translation of JP 09-204278 A by Kenji Yoshida.*

* cited by examiner

FIG.2
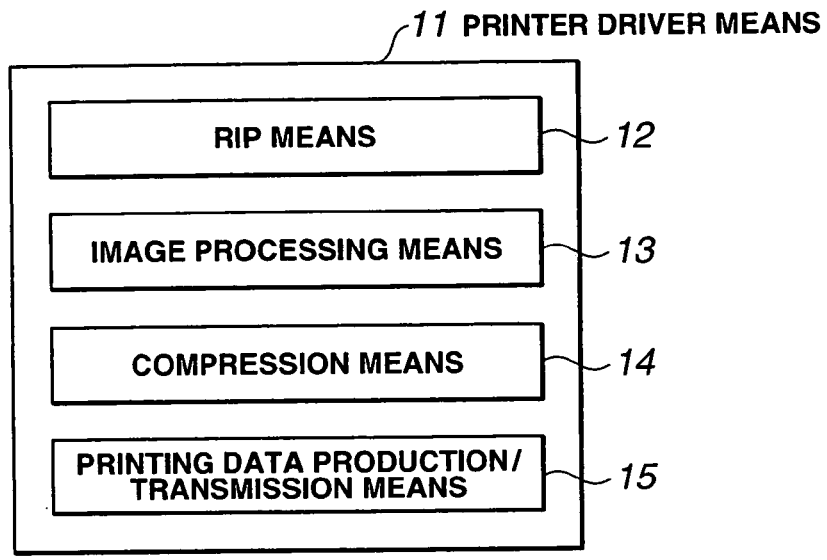
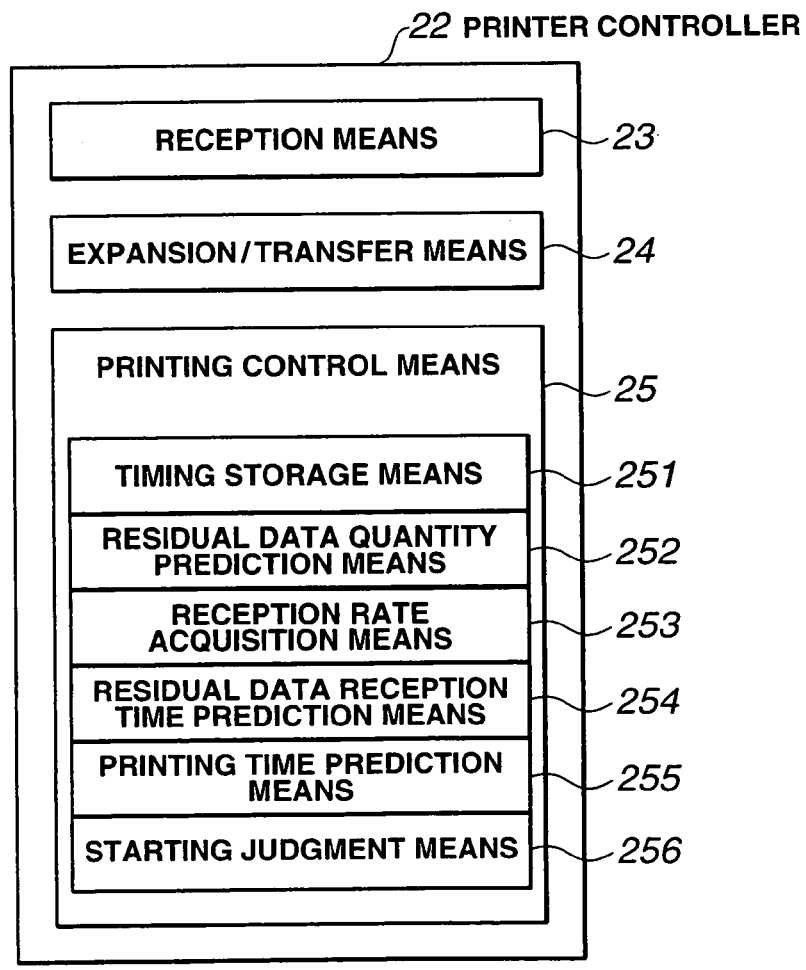

FIG.4

TABLE A

| | PARALLEL | | USB | | Ethernet | |
|---|---|---|---|---|---|---|
| COMMUNICATIONS INTERFACE STANDARD | Compatibility mode | ECP mode | FS mode | HS mode | 10BaseT | 100BaseT |
| STANDARD VALUE (BIT/SEC) | — | 16000000 | 12000000 | 480000000 | 10000000 | 100000000 |
| REFERENCE RATE (BIT/SEC) | 3000000 | 3000000 | 6000000 | 32000000 | 7500000 | 20000000 |

TABLE B

| | | CPU CLOCK | | | | |
|---|---|---|---|---|---|---|
| | | LESS THAN 500M | 500M OR GREATOR BUT LESS THAN 1G | 1G OR GREATOR BUT LESS THAN 1.5G | 1.5G OR GREATOR BUT LESS THAN 2G | 2G OR GRATOR |
| RAM CAPACITY | LESS THAN 256M | 0.55 | 0.6 | 0.65 | 0.7 | 0.75 |
| | 256M OR GREATOR BUT LESS THAN 512M | 0.75 | 0.8 | 0.85 | 0.9 | 0.95 |
| | 512M OR GREATOR BUT LESS THAN 1G | 0.8 | 0.85 | 0.9 | 0.95 | 1 |
| | 1G OR GREATOR | 0.85 | 0.9 | 0.95 | 1 | 1 |

HOST BASED PRINTER, HOST DEVICE AND PRINTING CONTROL METHOD

BACKGROUND OF THE INVENTION

The present invention relates to a printer system comprising a host device and a host based printer (i. e., a host based printer system), and more particularly relates to a technique suitable for a host based printer which receives compressed data of a printed image from a host device, expands this compressed data so that the printed image is restored, and performs printing on the basis of this printed image.

Ordinarily, in host based printer systems, a framework is adopted in which 1) rasterizing processing (development into a bit map) is performed in a host device on printing data that includes text, figures, images and the like, so that a printed image is produced, 2) the printed image is transferred from the host device to a host based printer, 3) in this host based printer, a controller transfers the printed image to a printing engine in accordance with the synchronizing signal of this printing engine, and 4) the printing engine performs printing.

Here, in the host based printer, in cases where the reception rate of the data from the host device is slower than the printing rate of the printing engine, a construction is ordinarily used in which the received data is temporarily stored in a receiving buffer inside the host based printer so that the data does not become exhausted during printing, and printing is started at a point at which at least a certain amount of data has been stored in this receiving buffer.

In cases where such a construction is used, a method has been proposed in which printing is started before a printed image corresponding to one page has been received, in order to shorten the waiting time from the point in time at which a printing command is received to the point in time at which printing is actually started. For instance, in cases where the transfer and the like of printed image are performed in band units, it is conceivable that a timing at which the number of bands that have been received reaches a predetermined proportion of the total number of bands may be taken as the timing at which printing is started (for example, printing is started at the point in time at which 1/10 of the bands corresponding to one page are received in a host based printer).

SUMMARY

In cases where the timing at which printing is started is set at a fixed point, such as the point in time at which 1/10 of the total bands are received, the receiving buffer may become empty during printing if the reception rate is slower than envisioned, so that there is a danger that printing may fail.

In the technique described in Japanese Patent Application Laid-Open No. 9-300708, an attempt is made to solve this problem by calculating the time extending from the point in time at which the hopping operation is ended to the point in time at which the reception of the printing data is completed is calculated on the basis of the data transfer rate and the length of the data corresponding to one page contained in the header information of the printing data, and the timing at which printing is started is appropriately determined on the basis of this time.

However, in host based printer systems, a construction is ordinarily used in which a printed image is transmitted to the printer after being compressed in the host device. In this case, the data length following compression varies according to the compression rate that can be achieved; as a result, the data length corresponding to one page cannot be ascertained until compression processing has been completed for one page.

Accordingly, in the case of the technique described in Japanese Patent Application Laid-Open No. 9-300708, which utilizes the data length corresponding to one page contained in the header information of the printing data, the printer cannot determine the timing at which printing is started unless the data length is first ascertained by completing the compression processing for one page in the host device, and this data length is then transmitted in a state in which this data length is embedded in the header information; naturally, therefore, printing cannot be started, either. Specifically, since the printer cannot start printing until after the compression processing for one page has been completed in the host device, the following problem still remains: namely, the waiting time until printing is started after a print command is received is lengthened (i. e., the throughput drops).

Accordingly, it is an object of the present invention to provide a framework in a host based printer system which makes it possible to appropriately determine the timing at which printing is started, and to start printing, without waiting for the completion of the compression processing even in cases where compressed data of the printed image is transmitted to the host based printer from the host device.

In order to achieve such an object, the host based printer of the present invention is a host based printer which receives compressed data of a printed image from a host device, restores the printed image by expanding this compressed data, and performs printing on the basis of this printed image, comprising storage means for storing a timing S at which it is judged whether or not a printing operation can be started with respect to the print target image (image to be printed), first prediction means for predicting the data quantity q of the remaining compressed data of the print target image on the basis of the data quantity p of the compressed data that is received by the timing S for the print target image when the timing S arrives, second prediction means for predicting the time T1 that is required to receive the data of the abovementioned predicted data quantity q, third prediction means for predicting the time T2 that is required to print the print target image, and starting judgment means which judges that printing can be started for the print target image in cases where T1 is equal to or less than T2, and which cause a printing operation be performed that restores and prints the print target image.

Preferably, the abovementioned first prediction means determines the band average data quantity on the basis of the number of received bands and the data quantity p, and predicts the data quantity q by multiplying the number of bands not yet received by the band average data quantity.

Preferably, furthermore, the host base printer of the present invention further comprises means for setting the initial value of the timing S on the basis of a timing designated by the host device.

In the case of such a construction, the printing operation can be started at an appropriate timing on the basis of the residual data reception time T1 even in cases where the total amount of data that is received is not ascertained beforehand. As a result, even in cases where compressed data of the print target image is produced in the host device and transmitted to the printer, the printing operation can be started at an appropriate timing without waiting for the compression processing in the host device to be completed so that the total amount of compressed data is ascertained. Consequently, the waiting time from the point in time at which the printing command is received to the point in time at which printing is started can be reduced, so that the throughput can be greatly improved.

Preferably, furthermore, the host based printer of the present invention further comprises means for determining the reception rate V relating to the compressed data on the basis of the standard for the communications interface that receives the compressed data and information relating to the performance of the compression processing in the host device, and the abovementioned second prediction means predicts the time T1 on the basis of the data quantity q and the reception rate V.

In the case of such a construction, the data reception rate can be determined and the residual data reception time T1 can be predicted without utilizing any chronometric means such as a timer or the like.

Preferably, the host based printer of the present invention comprises means for actually measuring the reception rate V relating to the compressed data, and the abovementioned second prediction means predicts the time T1 on the basis of the data quantity q and the reception rate V.

In the case of such a construction, the residual data reception time T1 can be predicted with variations in the reception rate being handled in a flexible manner.

Preferably, the abovementioned starting judgment means judges that a printing operation cannot be started for the print target image in cases where T1 is greater than T2, and resets the timing S while referring to the abovementioned storage means in order to re-judge whether or not the printing operation can be started.

In the case of such a construction, the timing S at which it is judged whether or not the printing operation can be started can be reset so that it can repeatedly be judged whether or not printing can be started, thus making it possible to start the printing operation with the starting timing determined more accurately.

Preferably, the abovementioned starting judgment means judges that a printing operation cannot be started for the print target image in cases where T1 is greater than T2, and causes the printing operation to be performed after a time of at least (T1−T2) has elapsed from the timing S.

In the case of such a construction, since there is a high probability that the residual data reception time will be equal to or less than the printing time T2 at the time that the printing operation is started, the possibility that the data will become exhausted during the execution of printing can be reduced.

Preferably, the abovementioned starting judgment means judges that a printing operation cannot be performed for the print target image in cases where T1 is greater than T2, resets the timing S on the basis of (T1−T2) in cases where (T1−T2) is equal to or less than a predetermined time m, and resets the timing S on the basis of a predetermined time n that is shorter than (T1−T2) in cases where (T1−T2) exceeds the predetermined time value m. It is desirable that the predetermined time m and/or the predetermined time n be determined on the basis of the initial value of the timing S.

In the case of such a construction, even if the reception rate V varies during data reception, the effect of this variation can be reflected in the timing S in a timely manner, so that the question of whether or not the printing operation can be started can be judged at a more appropriate timing.

The host device of the present invention is a host device comprising the function of transmitting compressed data produced by compression processing to a host based printer while performing this compression processing on a printed image, wherein information relating to the performance of the compression processing in this host device is transmitted to the host based printer when the compressed data is transmitted to the host based printer.

It is desirable that the abovementioned information relating to the performance include at least specification information for the CPU and/or memory mounted in the host device.

The host based printer system of the present invention comprises the host based printer of the present invention and the host device of the present invention.

The printing control method of the present invention is a printing control method in a host based printer which receives compressed data of a printed image from a host device, restores the printed image by expanding this compressed data, and performs printing on the basis of this printed image, this method comprising the steps of predicting the data quantity q of the remaining compressed data of the print target image on the basis of the data quantity p of the compressed data that is received by the timing S at which it is judged that a printing operation can be performed for the print target image (image to be printed) when the timing S arrives for this print target image, predicting the time T1 that is required to receive the data of the abovementioned predicted data quantity q, predicting the time T2 that is required to print the print target image, and judging that a printing operation can be started for the print target image in cases where T1 is equal to or less than T2, and causing a printing operation be performed that restores and prints the print target image in such cases.

The printing control method of the present invention can be performed by means of the CPU installed in the host based printer; the computer program that is used for this can be installed or loaded into the host device and host based printer via various types of media such as a CD-ROM, magnetic disk, semiconductor memory, communications network or the like. Furthermore, such computer programs also include programs that are circulated by being recorded on printer cards or optional printer boards.

By using the present invention, it is possible to appropriately set the printing start timing and to start printing in a host based printer system without waiting for the completion of the compression processing even in cases where compressed data of the printed image is transmitted to the host based printer from the host device.

DESCRIPTION OF DRAWINGS

FIG. 2 is a block diagram showing the functional construction of the printer driver means 11 and printer controller 22;

FIG. 4 is a diagram showing tables to which reference is made when the reception rate is determined;

DETAILED DESCRIPTION

Figure 1:
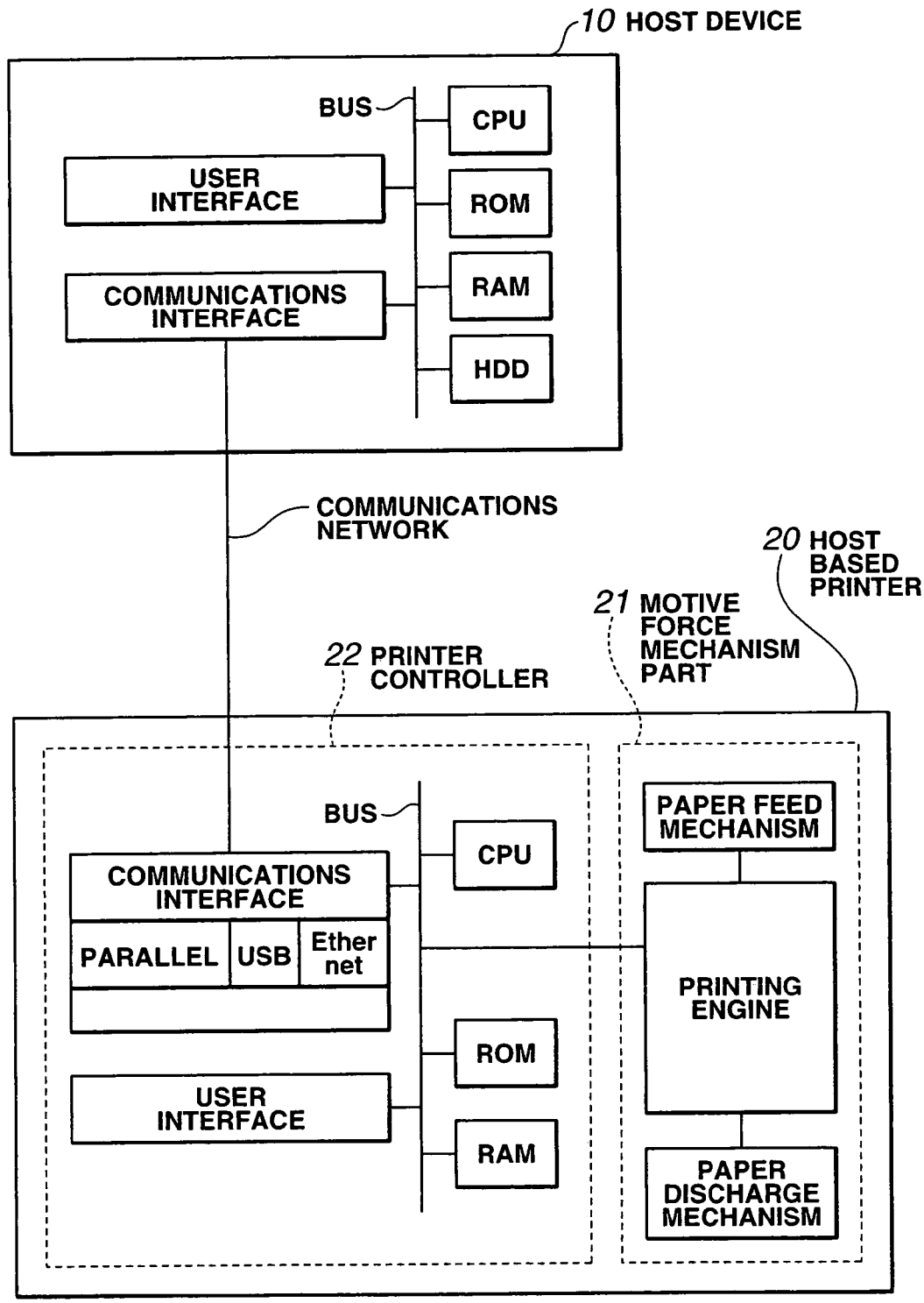
FIG. 1 is a block diagram showing the hardware construction of a printer system constituting an embodiment of the present invention.
Figure 3:
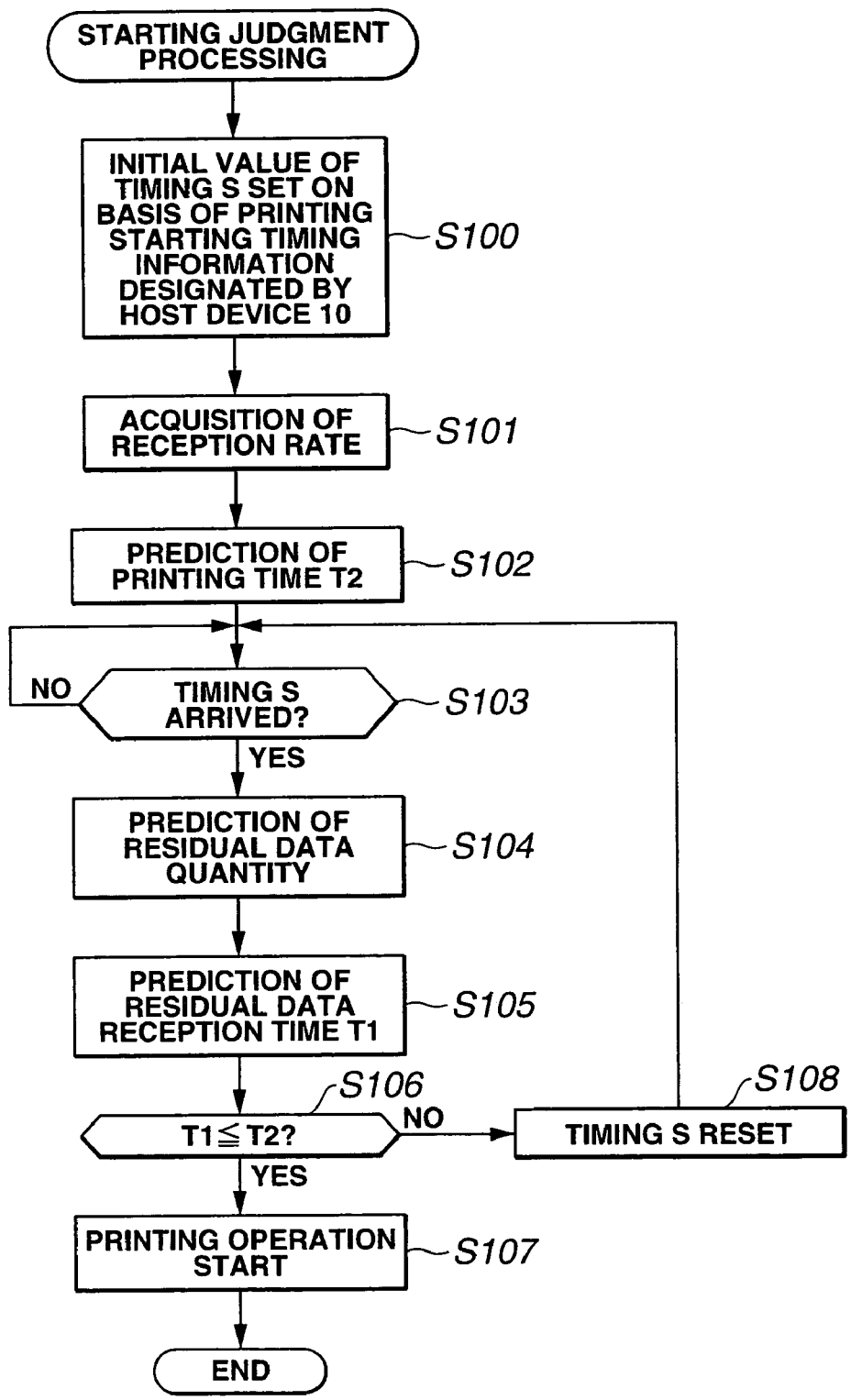
FIG. 3 is a flow chart showing the flow of a first example of the printing starting judgment processing in the host based printer 20.
Figure 5:
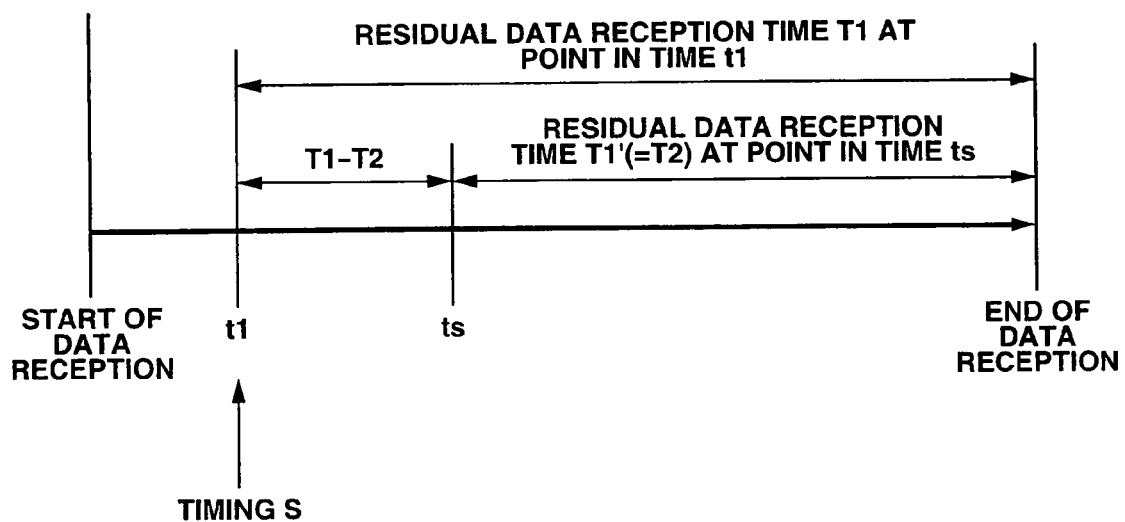
FIG. 5 is a diagram illustrating the method used to determine the timing S in the case of re-setting.
Figure 6:
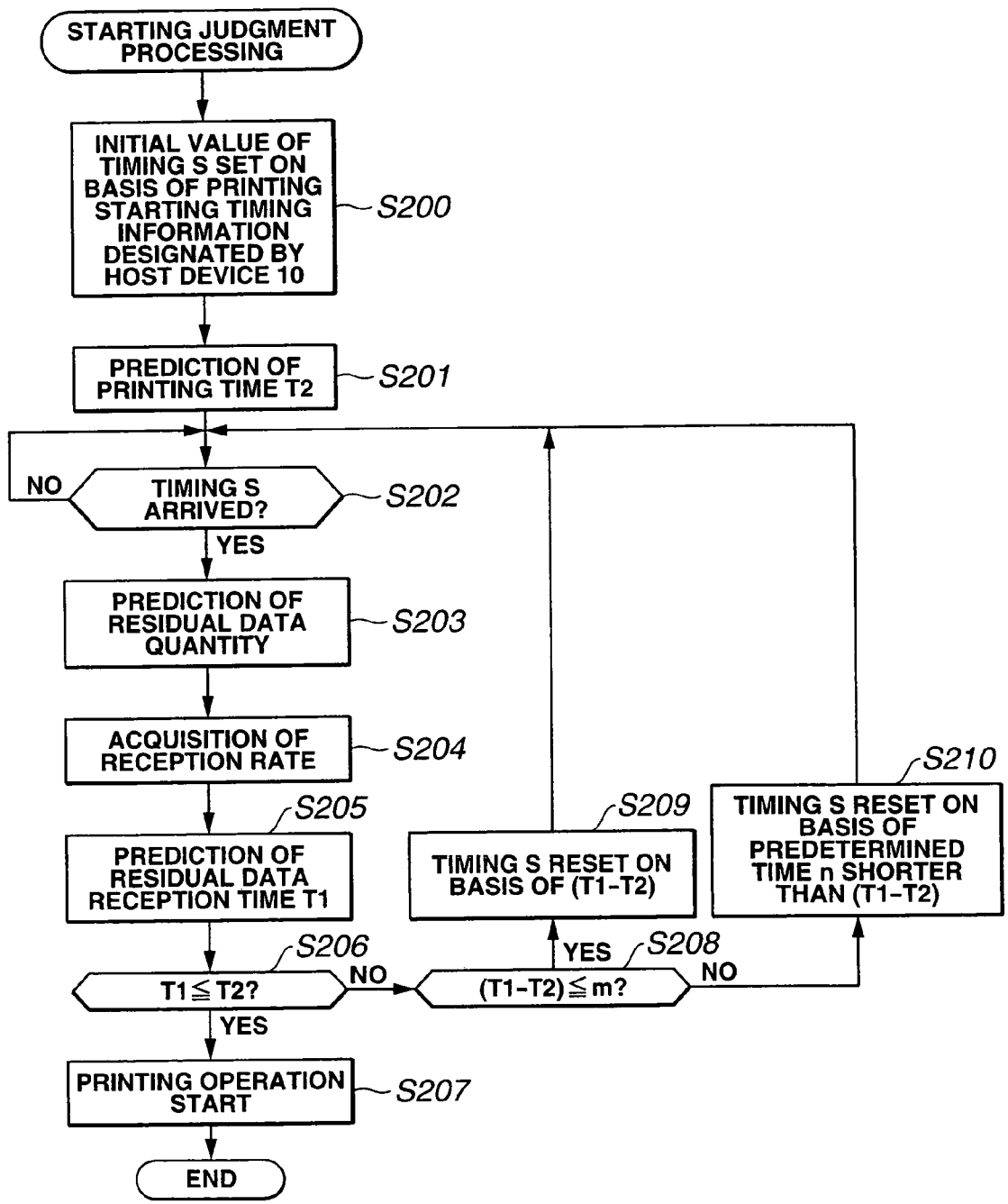
FIG. 6 is a flow chart showing the flow of a second example of the printing starting judgment processing in the host based printer 20.

FIG. 1 is a block diagram shows the hardware construction of a printer system 1 constituting an embodiment of the present invention. As is shown in FIG. 1, the printer system 1 includes a host device 10, and a host based printer (image forming device) 20 which is constructed so that this printer can communicate with the host device 10 via a communications network (LAN, internet, dedicated line, packet communications net, combination of these networks or the like, including both communications by wire and wireless communications).

As hardware, the host device 10 comprises a CPU, ROM, RAM, HDD, user interface, communications interface and the like.

Furthermore, the host device 10 comprises printer driver means 11 as an ordinary control function that is required to cause the printer 20 to perform printing.

The printer driver means 11 constitutes a functional construction similar to that of an ordinary printer driver; for example, the printer driver means 11 comprises RIP means 12 that produces a printed image by performing rasterizing processing on the basis of printing data (including text, drawings, images and the like) described by a specified printer control language such as Postscript or the like in accordance with printing requests from an application program operated by the host device 10, image processing means 13 that performs specified image processing (screen processing and the like) on the printed image, compression means 14 that performs compression processing on the printed image and produces compressed data, printing data production/transmission means 15 that produces printing data by adding header information and the like to the compressed data, and transmits this printing data to the host based printer 20, and the like (see FIG. 2).

Here, as will be described later, the printing data production/transmission means 15 differs from a conventional construction in that the means transmits information relating to the performance of the compression processing in the host device 10 and information regarding the printing starting timing designated on the basis of the size and the like of the print target image (image to be printed) to the host based printer 20 as header information of the printing data.

Furthermore, the respective means described above can be realized as functional means by using the CPU to execute programs stored in an HDD, ROM or RAM inside the host device 10, or in an external storage medium or the like, or by using dedicated hardware.

The host based printer 20 comprises a motive force mechanism part 21 and a printer controller 22.

The motive force mechanism part 21 is constructed from a paper feed mechanism that supplies paper to the printer, a printing engine that performs printing on the basis of the printed image, a paper discharge mechanism that discharges the paper to the outside of the printer and the like. For example, various types of printing engines corresponding to serial printers that perform printing in units of one character as in ink jet printers or thermal transfer printers, line printers that perform printing in units of one line, page printers that perform printing in page units or the like can be used as the printing engine. Furthermore, in the case of printing engines corresponding to laser printers, various types such as tandem engines, four-cycle engines or the like can be used.

The printer controller 22 comprises a CPU, ROM, RAM, user interface, communications interface and the like as hardware. For example, various types of interfaces corresponding to standards such as Parallel IF, USB, Ethernet or the like can conceivably be used as the communications interface.

The printer controller 22 comprises functions similar to those of the printer controller in an ordinary host based printer. For example, the printer controller 22 comprises reception means 23 that receives commands, printing data and the like from the host device 10 and stores such commands and data in a receiving buffer (not shown in the figures), expansion/transfer means 24 that restores the printed image by expanding the compressed data contained in the printing data, and transfers this restored printed image to the printing engine, printing control means 25 that controls the expansion/transfer means 24 and the printing operation of the motive force mechanism part 21 (printing engine), and the like.

Here, the printing control means 25 of the present embodiment differs from a conventional construction in that the means comprises timing storage means 251 that stores the timing S at which it is judged whether or not a printing operation can be started for the print target image, residual data quantity prediction means 252 that predicts the data quantity q of the residual compressed data (hereafter referred to as the "residual data") of the print target image on the basis of the data quantity p of the compressed data received by the timing S for the print target image when the timing S arrives, reception rate acquisition means 253 that determines the reception rate V relating to the compressed data, residual data reception time prediction means 254 that predicts the time (hereafter referred to as the "residual data reception time") T1 that is required to receive the residual data of the data quantity q on the basis of the data quantity q and the reception rate V, printing time prediction means 255 that predicts the time (hereafter referred to as the "printing time") T2 that is required to print the print target image, and starting judgment means 256 which judges that a printing operation can be performed for the print target image in cases where T1 is equal to or less than T2, and controls the expansion/transfer means 24 and motive force mechanism part 21 (printing engine) so that a printing operation that restores the print target image and executes printing is performed (see FIG. 2).

Furthermore, the respective means described above can be realized as functional means by using the CPU to execute programs stored in an RAM, ROM or RAM inside the host based printer 20, or in an external storage medium or the like, or by using dedicated hardware.

The printing processing performed in the printer system 1 will be described below with reference to FIGS. 3 through 6. Furthermore, the respective processes (including partial processes for which no symbols are given) may be performed in an arbitrarily altered order or in parallel, as long as there is no conflict in the contents of the processes.

(Processing Performed in Host Device 10)

When the printer driver means 11 receives printing requests from an application program operated externally or in the host device 10, the means transmits a printing instruction command to the host based printer (printer controller 22), and instructs the RIP means 12 and the like to start processing.

When the RIP means 12 receives an instruction to start processing, the means produces an print target image on the basis of data that is the object of printing (data that is the object of printing described by a specified printer control language such as Postscript or the like) received from the application program, and stores this image in a specified region of the RAM. Furthermore, in cases where data that is the object of printing can be received in a raster image format from the application program or the like, processing by the RIP means 12 can be omitted. Moreover, in the case of a color image, for example, the print target image may also contain data with attribute values (parameter values designating LUT or the like) used for color conversion or halftone processing in addition to respective plain data of CYMK.

The image processing means 13 performs specified image processing (screen processing and the like) on a produced print target image (as necessary).

The compression means 14 produces compressed data by performing specified compression processing on the print target image in band units constructed from a specified number of scanning lines (e. g., 64 lines), and stores this compressed data in a specified region of the RAM. Furthermore, various conventional compression algorithms such as the JPEG (Joint Photographic Coding Experts Group) system, JBIG (Joint Bi-level Image Experts Group) system or the like, can be used in accordance with the design as the specified compression processing.

The printing data production/transmission means 15 produces printing data by adding specified header information to each band unit of compressed data, and successively transmits this data to the host based printer 20, without waiting for the compression processing of the print target image to be completed by the compression means 14.

Here, when the printing data production/transmission means 15 produces printing data for at least the first band of compressed data of the print target image, the means adds information relating to the performance of the compression processing in the host device 10 and information regarding the printing starting timing designated on the basis of the size or the like of the print target image to the header information of this printing data.

For instance, specification information for the CPU and memory mounted in the host device 10 (e. g., type and clock of the CPU, capacity of the RAM used as a work area during compression processing and the like) is a conceivable example of the information relating to the performance of the compression processing.

In cases where the compression processing and the like are performed in band units as in the present embodiment, the printing starting timing can be designated with reference to the bands, e. g., as the point in time at which a certain proportion of the bands relative to the total number of bands have been received or the like. In this case, for example, information combining the total number of bands and the predetermined proportion, information indicating the band number at which printing may be started obtained by multiplying the total number of bands by the predetermined proportion or the like is conceivable as such printing starting timing information. Furthermore, the total number of bands can be determined in advance on the basis of the size of the print target image (predetermined size and printing resolution), as (for example) 200 bands in the case of A4 size, 300 dpi.

Furthermore, the system can be constructed so that such information is transmitted to the host based printer 20 separately from the compressed data.

(Processing Performed in the Host Based Printer 20)

The reception means 23 receives commands, printing data and the like from the host device 10, and stores such commands and data in a receiving buffer.

The printing control means 25 successively reads out and interprets commands from the receiving buffer. Furthermore, in cases where the interpreted commands are printing instruction commands, the printing control means 25 controls the motive force mechanism part 21 so that preparations are made for printing, and executes the following printing operation starting judgment processing.

FIRST EXAMPLE

FIG. 3

First, the printing control means 25 extracts printing starting timing information designated by the host device 10 from the header information of the printing data corresponding to the printing instruction command. Then, on the basis of the abovementioned extracted printing starting timing information, the initial value of the timing S at which it is judged whether or not a printing operation for the print target image can be started is set, and this timing S is stored in the timing storage means 251 constructed in a predetermined region of the RAM (S100).

Next, the printing control means 25 determines the reception rate V relating to the compressed data (reception rate acquisition: S101).

The reception rate V can also be actually measured utilizing chronometric means such as a timer or the like; in the present example, however, a method is used in which the reception rate V is determined on the basis of the standard (including various types of mode information) for the communications interface used in the reception of compressed data in the reception means 23, and information relating to the performance of the compression processing in the host device which is contained in the header information of the printing data.

As a concrete example, the reception means 23 is constructed so that the means can received compressed data according to three types of communications interface standards, i. e., Parallel, USB and Ethernet; furthermore, a case is envisioned in which the clock of the CPU and the capacity of the RAM mounted in the host device 10 can be utilized as information relating to the performance of the compression processing. In this case, for example, two tables A and B such as those shown in FIG. 4 are stored in the ROM, nonvolatile RAM or the like of the host based printer 20. Furthermore, the standard rate Vm is determined by applying the communications interface standard and communications mode used in the reception of compressed data to Table A, and a coefficient P is determined by applying the CPU clock and RAM capacity to Table B. Then, the reception rate V is determined by multiplying the standard rate Vm by the coefficient P. For example, in a case where the communications interface standard is the FS mode of USB, and the CPU clock and RAM capacity are respectively 1.5 G and 512 M, the reception rate V is 6,000,000×0.95=5,700,000 (bit/sec).

Furthermore, the numerical values and constructions of the tables shown in FIG. 4 are merely examples, and may be variously altered according to the design. For example, the concrete numerical values of the standard rate Vm and the like can be determined by experiment; furthermore, in regard to Table B, it would also be possible to use a construction in which the coefficient P is determined using only the specification information for either the CPU or the memory.

Next, the printing control means 25 predicts the time (printing time) T2 that is required to print the print target image (printing time prediction: S102).

For example, the following procedure is conceivable as the prediction procedure. First, the time from the start of expansion processing to the completion of printing processing for one band (band printing time) is set beforehand on the basis of the rate of execution of expansion processing and transfer processing in the expansion/transfer means 24, the operating speed of the printing engine and the like. Then, the predicted value of the printing time T2 is determined by multiplying this band printing time by the total number of bands determined on the basis of the size of the print target image.

Furthermore, in cases where the expansion/transfer means 24 is constructed from dedicated hardware, there is a great possibility that the operating speed of the printing engine will be the governing factor; in such cases, therefore, it is advisable to set the band printing time mainly on the basis of the operating speed of the printing engine.

Next, the printing control means 25 refers to the timing storage means 251, and ascertains whether or not the timing S has arrived; the printing control means 25 then waits until this timing S arrives (S103).

For example, in cases where the timing S is predetermined by a certain proportion relative to the total number of bands (or the number of the band), the printing control means 25 monitors the conditions of reception of the compressed data of the print target image, and at the point in time at which the reception of compressed data has been completed for a predetermined proportion of the bands relative to the total number of bands (or a band with the band number), the printing control means 25 judges that the timing S has arrived. On the other hand, in cases where the timing S is reset with the point in time designated, the printing control means 25 judges the arrival of the timing S by checking an internal timer or the like.

In cases where it is judged that the timing S has arrived, the printing control means 25 predicts the data quantity q of the remaining compressed data (residual data) of the print target image on the basis of the data quantity p of the compressed data that has been received by this timing S for the print target image (prediction of residual data quantity: S104).

For example, the following procedure is conceivable as the prediction procedure. First, the band average data quantity for the bands that have been received is determined on the basis of number of bands of the image constituting the object of printing that have already been received (e. g., a number of bands corresponding to $\frac{1}{10}$ of the total number of bands) and the data quantity p. Next, the predicted value of the data quantity q is determined by multiplying the number of bands of the image constituting the object of printing that have not yet been received (e. g., a number of bands corresponding to $\frac{9}{10}$ of the total number of bands) by this band average data quantity. Furthermore, in the case of a color image, for example, the band average data quantity and the data quantity of the residual data may be determined in common or in a coupled manner with regard to the respective plain data for CMYK, while in the case of data with attributes for color conversion or halftone processing, it is desirable that the band average data and data quantity of the residual data be determined separately from CMYK.

Next, on the basis of the data quantity q and reception rate V, the printing control means 25 predicts the time (residual data reception time) T1 that is required to receive the residual data of the data quantity q (residual data reception time prediction: S105). In concrete terms, the predicted value of the residual data reception time T1 can be determined by dividing the data quantity q by the reception rate V.

Next, the printing control means 25 compares the residual data reception time T1 and the printing time T2.

Then, in cases where T1 is equal to or less than T2 the printing control means 25 judges that a printing operation can be performed for the print target image, and starts a printing operation (starting timing judgment: S107). In concrete terms, the paper feed mechanism is controlled so that paper is caused to wait in the printing starting position (i. e., paper is fed). Furthermore, the expansion/transfer means 24 is controlled so that the compressed data stored in the receiving buffer is successively expanded, thus restoring the print target image, and the printing engine is caused to print this restored print target image. Furthermore, the printing engine is controlled so that this printing engine is caused to execute printing on the basis of the print target image.

On the other hand, in cases where T1 is greater than T2, the printing control means 25 judges that a printing operation cannot be started, and reset the timing S stored in the timing storage means so that the possibility of starting the printing operation is re-judged later at a time specified by the timing S (S108); the processing then returns to S101.

In this case, it is desirable that a point in time that is equal to or later than the point in time ts be reset as the new timing S, where the point in time at which the currently set timing S arrives is designated as t1, and the point in time ts is determined by ts=t1+T1−T2. As is seen from FIG. 5, the reason for this is as follows: namely, the residual data reception time T1' at the point in time ts based on the predicted value at the point in time t1 agrees with the printing time T2; accordingly, in cases where the residual data reception time is predicted at a point in time that is equal to or later than the point in time ts, there would appear to be a high probability that this predicted value will be equal to or less than the printing time T2 (i. e., that it will be judged that a printing operation is possible).

SECOND EXAMPLE

FIG. 6

The second example is a processing construction which is as a rule similar to the first example; however, this second example differs from the first example in that 1) the reception rate is determined on the basis of the number of sets of data received, and 2) when the timing S is reset, an adjustment is made so that the interval between the current timing S and the timing S following resetting is kept within appropriate limits.

First, the printing control means 25 extracts the printing starting timing information designated by the host device 10 from the header information of the printing data corresponding to the printing instruction command. Then, on the basis of the abovementioned printing starting timing information, the initial value of the timing S at which it is judged whether or not a printing operation can be performed for the print target image is set, and this initial value is stored in the timing storage means 251 constructed in a predetermined region of the RAM (S200).

Next, the printing control means 25 predicts the time (printing time) T2 that is required to print the print target image (printing time prediction: S201).

For example, the following procedure is conceivable as the prediction procedure. First, the time extending from the start of the expansion processing to the completion of the printing processing for one band (i. e., the band printing time) is set in advance on the basis of the rate at which the expansion processing and transfer processing are performed in the expansion/transfer means 24, the operating speed of the printing engine and the like. Then, the predicted value of the printing time T2 is determined by multiplying the abovementioned band printing time by the total number of bands determined on the basis of the size of the print target image.

Furthermore, in cases where the expansion/transfer means 24 is constructed from dedicated hardware, there is a great possibility that the operating speed of the printing engine will be the governing factor; in such cases, therefore, it is advisable to set the band printing time mainly on the basis of the operating speed of the printing engine.

Next, the printing control means 25 refers to the timing storage means 251, and ascertains whether or not the timing S has arrived; the printing control means 25 then waits until this timing S arrives (S202).

For example, in cases where the timing S is specified by a certain proportion relative to the total number of bands (or the number of the band), the printing control means 25 monitors the conditions of reception of the compressed data of the print target image, and at the point in time at which the reception of compressed data has been completed for a predetermined proportion of the bands relative to the total number of bands (or a band with the band number), the printing control means 25 judges that the timing S has arrived. On the other hand, in cases where the timing S is reset with the point in time designated, the printing control means 25 judges the arrival of the timing S by checking an internal timer or the like.

In cases where it is judged that the timing S has arrived, the printing control means 25 predicts the data quantity q of the remaining compressed data (residual data) of the print target image on the basis of the data quantity p of the compressed data that has been received by this timing S for the print target image (prediction of residual data quantity: S203).

For example, the following procedure is conceivable as the prediction procedure. First, the band average data quantity for the bands that have been received is determined on the basis of number of bands of the image constituting the object of printing that have already been received (e. g., a number of bands corresponding to 1/10 of the total number of bands) and the data quantity p. Next, the predicted value of the data quantity q is determined by multiplying the number of bands of the image constituting the object of printing that have not yet been received (e. g., a number of bands corresponding to 9/10 of the total number of bands) by this band average data quantity.

Next, the printing control means 25 determines the reception rate V relating to the compressed data (reception rate acquisition: S204).

In the present example, a method is employed in which the data quantity of the data that is received within a predetermined time and the reception time required for the reception of this data are determined using chronometric means (not shown in the figures) such as an internal timer or the like, and the reception rate V is actually measured. As will be described later, there is a possibility that the reception rate will vary according to the processing conditions of the host; however, if a construction in which the reception rate is actually measured is used as in the present example, such a variation in the reception rate can be handled in a flexible manner, so that the residual data reception time T1 can be predicted.

From such a standpoint, it is desirable that the abovementioned predetermined time be set so that measurements can be performed to track actual reception rate even in cases where the reception rate varies. In concrete terms, in cases where the timing S is the initial value, it is conceivable that this predetermined time may be the time period extending from the start of reception to the timing S, and in cases where the timing S is a reset value, it is conceivable that this predetermined time may be the time period extending from the timing S prior to this resetting to the current timing S.

Next, the printing control means 25 predicts the time (residual data reception time) T1 that is required to receive the residual data of the data quantity q on the basis of the data quantity q and reception rate V (residual data reception time prediction: S205). In concrete terms, the predicted value of the residual data reception time T1 can be determined by dividing the data quantity q by the reception rate V.

Next, the printing control means 25 compares the residual data reception time T1 and the printing time T2 (S206).

Then, in cases where T1 is equal to or less than T2, the printing control means 25 judges that a printing operation can be started for the print target image, and start this printing operation (starting timing judgment: S207). In concrete terms, the paper feed mechanism is controlled so that paper is caused to wait in the printing starting position (i. e., so that paper is fed). Furthermore, the expansion/transfer means 24 is controlled so that the compressed data stored in the receiving buffer is successively expanded to restore the print target image, and so that the restored print target image is transferred to the printing engine. Furthermore, the printing engine is controlled so that this printing engine is caused to execute printing on the basis of the print target image.

On the other hand, in cases where T1 is greater than T2, the printing control means 25 judges that a printing operation cannot be started, and reset the timing S stored in the timing storage means in order to re-judge whether or not a printing operation can be started later at a point in time specified by the timing S (S208 through S210); the processing then returns to S201.

In concrete terms, the printing control means 25 compares (T1−T2) with a predetermined time m (S208), and in cases where (T1−T2) is equal to or less than the predetermined time m, the printing control means 25 resets the timing S on the basis of (T1−T2) (S209).

For example, in cases where the timing S is reset with the point in time designated, the timing S is reset by adding (T1−T2) to the timing S.

Furthermore, for example, in cases where the timing S is predetermined according to the band number (e. g., a point in time at which 10 bands have been received or the like), the number of bands k predicted to be received during (T1−T2) is determined using the following equation, and the timing S is reset by adding this number of bands k to the band number.

Band number k=(T1−T2)×reception rate V/band average data quantity

On the other hand, in cases where (T1−T2) exceeds the predetermined time m, the timing S is reset on the basis of a predetermined time n that is shorter than (T1−T2) so that the interval between the current timing S and the timing S following resetting is kept within an appropriate range (S210). Furthermore, in cases where the timing S is predetermined according to the band number, the timing S can be set by adding the band number k' of the following equation to the said band number (in the same manner as described above).

$$\text{Band number } k' = \text{predetermined time } n \times \text{reception rate } V/\text{band average data quantity}$$

Here, the predetermined time m can be determined in accordance with the design; however, for example, in cases where the initial value of the timing S is predetermined according to the band number, it is conceivable that a specified multiple (e. g., ×2) of the time required to receive data equal to this band number might be taken as the predetermined time m.

Furthermore, the predetermined time n can also be determined in accordance with the design; however, for example, in cases where the initial value of the timing S is predetermined according to the band number, it is conceivable that a specified multiple (e. g., ×1) of the time required to receive data equal to this band number might be taken as the predetermined time n.

The reason for performing an adjustment so that the interval between the current timing S and the timing S following resetting is kept within an appropriate range will be described below.

In the host device 10, as was described above, the printing data production/transmission means 15 successively transmits printing data to the host based printer 20 without waiting for the compression processing of all of the images that are the object of printing to be completed by the compression means 14. In this case, the processing performed by the RIP means 12, image processing means 13 and compression means 14, and the processing performed by the printing data production/transmission means 15, are performed in parallel until the processing of the RIP means 12, image processing means 13 and compression means 14 is completed for the print target image. Accordingly, the resources (CPU power, working memory and the like) allotted to the printing data production/transmission means are reduced in relative terms. On the other hand, after the processing of the RIP means 12, image processing means 13 and compression means 14 has been completed for all of the images that are the object of processing, the printing data production/transmission means 15 can also perform processing utilizing the resources that were previously consumed by the other respective means; accordingly, processing can be performed at a higher speed than in the case of the previous parallel processing (printing data can be produced and data can be transmitted at a higher speed).

Figure 7:
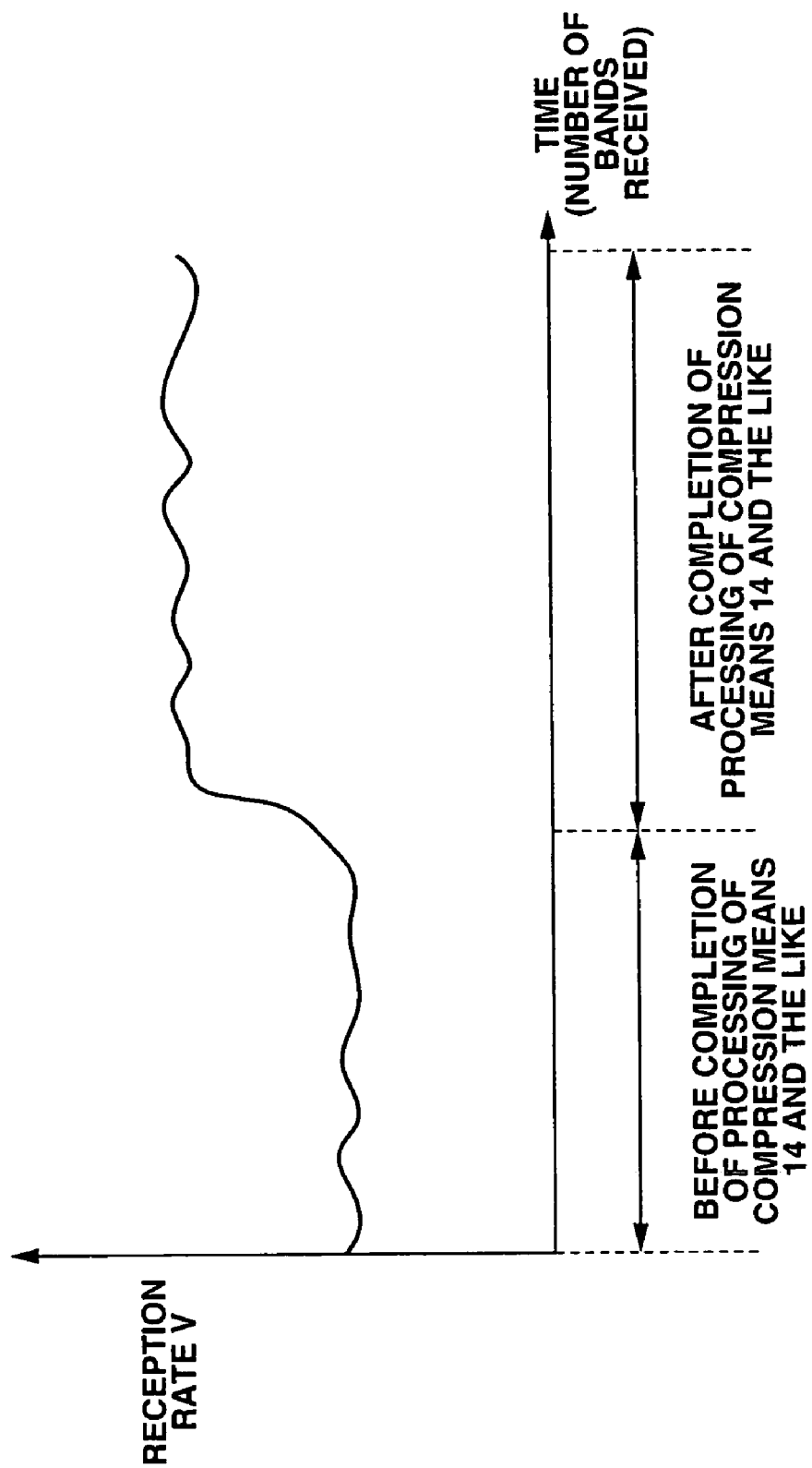
FIG. 7 is a diagram used to illustrate the manner in which the reception rate and the like vary over time.

Thus, there is a difference in the processing speed of the printing data production/transmission means 15 that is obtained, and therefore in the reception rate V that is obtained in the host based printer 20, prior to the completion of the processing of the compression means 14 and the like, and following the completion of this processing (see FIG. 7).

Here, conditions are envisioned in which the reception rate V is accelerated for the reasons described above after the timing S is reset. In this case, since the fact that the reception rate is accelerated is not reflected in the reset timing S, there is a danger that the timing at which it is judged whether or not a printing operation can be performed may not always be appropriate (i. e., there is a danger that this timing may be slower than necessary).

Accordingly, in a second example, the timing S is reset so that even in cases where the reception rate V is accelerated following the resetting of the timing S, the time period for which this accelerated reception rate V is not reflected in the timing S is not an overly long period of time. In concrete terms, the timing S is reset so that the interval between the timing S following resetting and the current timing S (which is the timing of actual measurement of the reception rate V) does not exceed a predetermined time m. If such a construction is used, then even if the reception rate V should vary during the reception of data, the effects of such a variation can be reflected in the timing S in a timely manner, so that the possibility of starting a printing operation can be judged with a more appropriate timing.

In the present embodiment, a construction is used in which the timing S at which it is judged whether or not a printing operation can be started is stored in memory, and the residual data reception time is predicted on the basis of the predicted value of the residual data quantity at this timing S. Consequently, even in cases where the total amount of data that is to be received has not been ascertained in advance, a printing operation can be started at an appropriate timing on the basis of the residual data reception time. Accordingly, even in cases where compressed data of the print target image are produced in the host device and transmitted to the printer, the printing operation can be started at an appropriate timing without waiting for the compression processing in the host device to be completed so that the total amount of compressed data is ascertained. As a result, the waiting time from the point in time at which a printing instruction is received to the point in time at which printing is started can also be reduced, so that the throughput can be greatly improved.

Furthermore, in the present embodiment, the timing S at which it is judged whether or not a printing operation can be started can be reset so that the question of whether or not printing can be started can be repeatedly judged; accordingly, the printing operation can be started with the starting timing determined more accurately.

The present invention is not limited to the abovementioned embodiments; various modifications can be applied. For example, an upper limit value X ($X \geq 1$) may be set (according to the design) on the number of times that the timing S is reset. In this case, at the timing S that has been reset for the time corresponding to the upper limit value on this number of times, the printing control means 25 starts the printing operation without performing a starting judgment.

Furthermore, for example, in the abovementioned embodiments, a construction is used in which the prediction of the residual data quantity, the prediction of the residual data reception time and the judgment of the possibility of starting are performed in the host based printer 20; however, the present invention is not limited to such a construction. For example, the system may also be constructed so that arbitrary processing operations among these processing operations are performed in the host device 10, and the host based printer 20 is notified of the results of these processing operations.

Furthermore, for example, in the abovementioned embodiments, a construction is used in which the expansion processing of the compressed data is performed after the starting judgment of the printing operation performed by the printing control means 25. However, the present invention is not necessarily limited to such a construction; it would also be possible to use a construction in which the expansion processing is performed prior to the starting judgment of the printing operation.

Furthermore, for example, in the abovementioned embodiments, (T1–T2) and the predetermined time m are directly compared; however, it would also be possible to use a construction in which a band number K" is determined using the equation shown below, and (T1−T2) and the predetermined time m are indirectly compared by comparing the band number k and the band number k".

Band number K"=predetermined time m×reception rate V/band average data quantity The entire disclosures of Japanese Patent Application No. 2004-83871 filed on Mar. 23, 2004 and No. 2004-150207 filed on May 20, 2004, including specifications, drawings and summaries, are incorporated herein by reference in their entirety.

I claim:

1. A host based printer which receives compressed data of a printed image from a host device, restores the printed image by expanding this compressed data, and performs printing on the basis of the printed image, comprising:
   storage means for storing a timing S at which it is judged whether or not a printing operation can be started with respect to the entirety of the image;
   first prediction means for predicting the data quantity q of the remaining compressed data of the entirety of the image on the basis of the data quantity p of the compressed data that has been received by the timing S for the entirety of the image, when the timing S arrives;
   second prediction means for predicting the time T1 that is required to receive the data of said predicted data quantity;
   third prediction means for predicting the time T2 that is required to print the entirety of the image; and
   starting judgment means which judges that printing can be started for the entirety of the image in cases where T1 is equal to or less than T2, and which cause a printing operation be performed that restores and prints the entirety of the image
   wherein said first prediction means determines a band average data quantity on the basis of the number of received bands and the data quantity p, and predicts the data quantity q by multiplying the number of bands not yet received by the band average data quantity.

2. The host based printer according to claim 1, further comprising means for setting the initial value of the timing S on the basis of a timing designated by the host device.

3. The host based printer according to claim 1, further comprising means for determining the reception rate V relating to the compressed data on the basis of the standard for the communications interface that receives the compressed data and information relating to the performance of the compression processing in the host device, wherein said second prediction means predicts the time T1 on the basis of the data quantity q and the reception rate V.

4. The host based printer according to claim 1, further comprising means for actually measuring the reception rate V relating to the compressed data, wherein said second prediction means predicts the time T1 on the basis of the data quantity q and the reception rate V.

5. The host based printer according to claim 1, wherein said starting judgment means judges that a printing operation cannot be started for the entirety of the image in cases where T1 is greater than T2, and reset the timing S while referring to said storage means in order to re-judge whether or not the printing operation can be started.

6. The host based printer according to claim 1, wherein said starting judgment means judges that a printing operation cannot be started for the entirety of the image in cases where T1 is greater than T2, and cause the printing operation to be performed after a time of at least (T1−T2) has elapsed from the timing S.

7. The host based printer according to claim 1, wherein a predetermined time m and/or a predetermined time n are determined on the basis of the initial value of the timing S.

8. The host device according to claim 1, wherein information relating to the performance includes at least specification information for the CPU and/or memory mounted in the host device.

9. A host based printer which receives compressed data of a printed image from a host device, restores the printed image by expanding this compressed data, and performs printing on the basis of the printed image, comprising:
   storage means for storing a timing S at which it is judged whether or not a printing operation can be started with respect to the entirety of the image;
   first prediction means for predicting the data quantity q of the remaining compressed data of the entirety of the image on the basis of the data quantity p of the compressed data that has been received by the timing S for the entirety of the image, when the timing S arrives;
   second prediction means for predicting the time T1 that is required to receive the data of said predicted data quantity;
   third prediction means for predicting the time T2 that is required to print the entirety of the image;
   starting judgment means which judges that printing can be started for the entirety of the image in cases where T1 is equal to or less than T2, and which cause a printing operation be performed that restores and prints the entirety of the image,
   wherein said first prediction means determines the band average data quantity on the basis of the number of received bands and the data quantity p, and predicts the data quantity q by multiplying the number of bands not yet received by the band average data quantity; and
   a host device comprising the function of transmitting compressed data produced by compression processing to a host based printer while performing this compression processing on a printed image, wherein information relating to the performance of the compression processing in said host device is transmitted to the host based printer when the compressed data is transmitted to the host based printer.

10. A printing control method in a host based printer which receives compressed data of a printed image from a host device, restores the printed image by expanding this compressed data, and performs printing on the basis of the printed image, said method comprising the steps of:
   predicting the data quantity q of the remaining compressed data of the entirety of the image on the basis of the data quantity p of the compressed data that is received by the timing S at which it is judged that a printing operation can be performed for the entirety of the image when the timing S arrives for the entirety of the image;
   predicting the time T1 that is required to receive the data of said predicted data quantity q;
   predicting the time T2 that is required to print the entirety of the image; and
   judging that a printing operation can be started for the entirety of the image in cases where T1 is equal to or less than T2, and causing a printing operation be performed to restore and print the image to be printed,
   wherein said first prediction means determines the band average data quantity on the basis of the number of received bands and the data quantity p, and predicts the data quantity q by multiplying the number of bands not yet received by the band average data quantity.

11. The host based printer according to claim 1, wherein the entirety of the image is an image corresponding to one page.

* * * * *